United States Patent [19]

Luechinger et al.

[11] Patent Number: 5,298,688
[45] Date of Patent: Mar. 29, 1994

[54] WEIGHING SCALE HOUSING HAVING MOVABLE PARALLEL WALL SEGMENTS

[75] Inventors: Paul Luechinger, Uster; Eduard Fringeli, Bubikon, both of Switzerland

[73] Assignee: Mettler-Toledo AG, Greifensee, Switzerland

[21] Appl. No.: 2,752

[22] Filed: Jan. 13, 1993

[30] Foreign Application Priority Data

Feb. 18, 1992 [CH] Switzerland ............... 474/92

[51] Int. Cl.⁵ ........................................... G01G 21/28
[52] U.S. Cl. ..................................................... 177/181
[58] Field of Search ................................ 177/180–182, 177/238–241

[56] References Cited

U.S. PATENT DOCUMENTS

| 3,359,573 | 12/1967 | Casebolt. | |
|---|---|---|---|
| 4,664,207 | 5/1987 | Knothe et al. | 177/181 |
| 4,700,793 | 10/1987 | Luechinger | 177/181 |
| 4,798,250 | 1/1989 | Knothe et al. | 177/181 |
| 4,979,579 | 12/1990 | Dardat et al. | 177/180 |
| 5,058,692 | 10/1991 | Melcher et al. | 177/181 |
| 5,170,855 | 12/1992 | Kunz et al. | 177/181 |

FOREIGN PATENT DOCUMENTS

| 7736324 | 3/1978 | Fed. Rep. of Germany. |
|---|---|---|
| 2911717 | 9/1980 | Fed. Rep. of Germany. |
| 8507282 | 4/1987 | Fed. Rep. of Germany. |
| 1196152 | 11/1959 | France. |
| 461121 | 10/1968 | Switzerland. |

*Primary Examiner*—George H. Miller, Jr.
*Attorney, Agent, or Firm*—Laubscher & Laubscher

[57] ABSTRACT

A top or side wall of a weighing scale housing includes a plurality of relatively movable segments that are slidably displaceable between closed and open positions, thereby to afford access to a weighing chamber defined within the housing, at least the longitudinal edge portions of the segments being in continuous overlapping relation. The end portions of the segments are guided within guide grooves formed in the housing wall on opposite sides of an access opening contained therein. Catch devices connected with the longitudinal edges of successive segments are engaged upon displacement of a first segment relative to the housing, thereby to effect corresponding displacement of a second segment.

13 Claims, 3 Drawing Sheets

WEIGHING SCALE HOUSING HAVING MOVABLE PARALLEL WALL SEGMENTS

CROSS-REFERENCE TO RELATED APPLICATION

This application is related to the companion applications in the names of Luechinger et al S/N 07/964,017 filed Oct. 21, 1992, [Our Case No. 18056], and Luechinger S/N 07/978,387 filed Nov. 18, 1992, [Our Case No. 18064]each assigned to the same assignee as the instant invention.

STATEMENT OF THE INVENTION

This invention relates to a weighing apparatus of the type having a housing containing a weighing chamber in which is movably mounted a weighing pan, characterized in that a side or top wall of the housing includes a plurality of slidably mounted segments displaceable between closed and open positions, thereby to afford access to the weighing chamber.

BRIEF DESCRIPTION OF THE PRIOR ART

It has been proposed previously, as evidenced by the German Gebrauchsmuster G7736324, to provide a housing for a weighing scale including a sliding window for opening and closing an access opening contained in the top wall of the housing. Furthermore, as shown by the Swiss patent No. 461,121, it has been proposed to provide the sidewalls of the housing with sliding window panels that are displaceable along guide rails between open and closed positions, thereby to afford lateral access to the weighing chamber.

In order to completely open the access openings to the weighing chamber, the slidable top or sidewall window elements must be capable of being displaced an appreciable distance beyond the rear wall of the housing. Thus, in the case of weighing scales of the type wherein the electronics and weighing cell components are contained beneath the weighing chamber, the displaceable side or top wall sections protrude an appreciable distance beyond the rear wall of the scale housing. Consequently, in order to permit the appropriate movement of the side wall or top wall sections, the weighing scale housing must be spaced an appreciable distance from equipment arranged behind the apparatus, or away from the adjacent wall of the room. Furthermore, the use of guide means that extend beyond the weighing scale housing is technically complicated and displeasing from an aesthetic viewpoint. Moreover, in the event that the displaceable section is not perfectly guided, then the section, which is generally higher than it is wide, gets stuck, particularly when the section is to be displaced out of the scale housing by more than half of its width.

The present invention was developed to provide a precision weighing apparatus wherein the access openings of the housing—either on the side or on the top of the housing—can be completely exposed and cleared without any extension of the slidable window elements beyond the rear wall of the housing, and without any possibility of the window segments getting stuck in the guide tracks as they are being displaced between their closed and open positions.

SUMMARY OF THE INVENTION

Accordingly, a primary object of the present invention is to provide a weighing scale housing in which a top wall and/or lateral access opening to the weighing chamber is closed by a plurality of window segments that overlap at their edges and are displaceable to open positions affording unobstructed access to the weighing chamber via the access opening.

According to another object of the invention, when a pair of window segments are provided, they are relatively shiftable to positions on top of each other, thereby making it possible to roughly reduce by half the space taken up by the rearwardly displaceable segments. In the case where three relatively movable window segments are provided, the overlap can be reduced to one-third.

According to a further object of the invention, the overlapping window segments are guided at their opposite ends by opposed parallel guide means that extend adjacent the opposed edges of the housing access openings. Cooperating catch means are provided on the overlapping longitudinal edges of the window segments so that upon movement of a first window segment in a direction to open the access opening, the catch element on the adjacent second window segment is engaged to effect similar displacement of the second segment in the same direction, thereby to further open the access opening. These catches extend the length of the window segments and cooperate to seal the weighing chamber when the window segments are displaced to the closed position, thereby avoiding contamination of the window segments which makes viewing therethrough rather difficult, and also interferes with the relative displacement of the segments. The window segments may be successively removed from the housing for cleaning by rearwardly displacing and lifting the same out of the guide means. Locking of the sections to prevent inadvertent dropping of the window segments is not necessary if the catch of the lowermost window engages that of the next superposed window segment.

Finally, a vertically displaceable instruction panel may be provided adjacent and parallel with the housing rear wall, thereby to retain the window segments in their respective guide channels.

BRIEF DESCRIPTION OF THE DRAWING

Other objects and advantages of the invention will become apparent from a study of the following specification when viewed in the light of the accompany drawings, in which.

DETAILED DESCRIPTION

Figure 1:
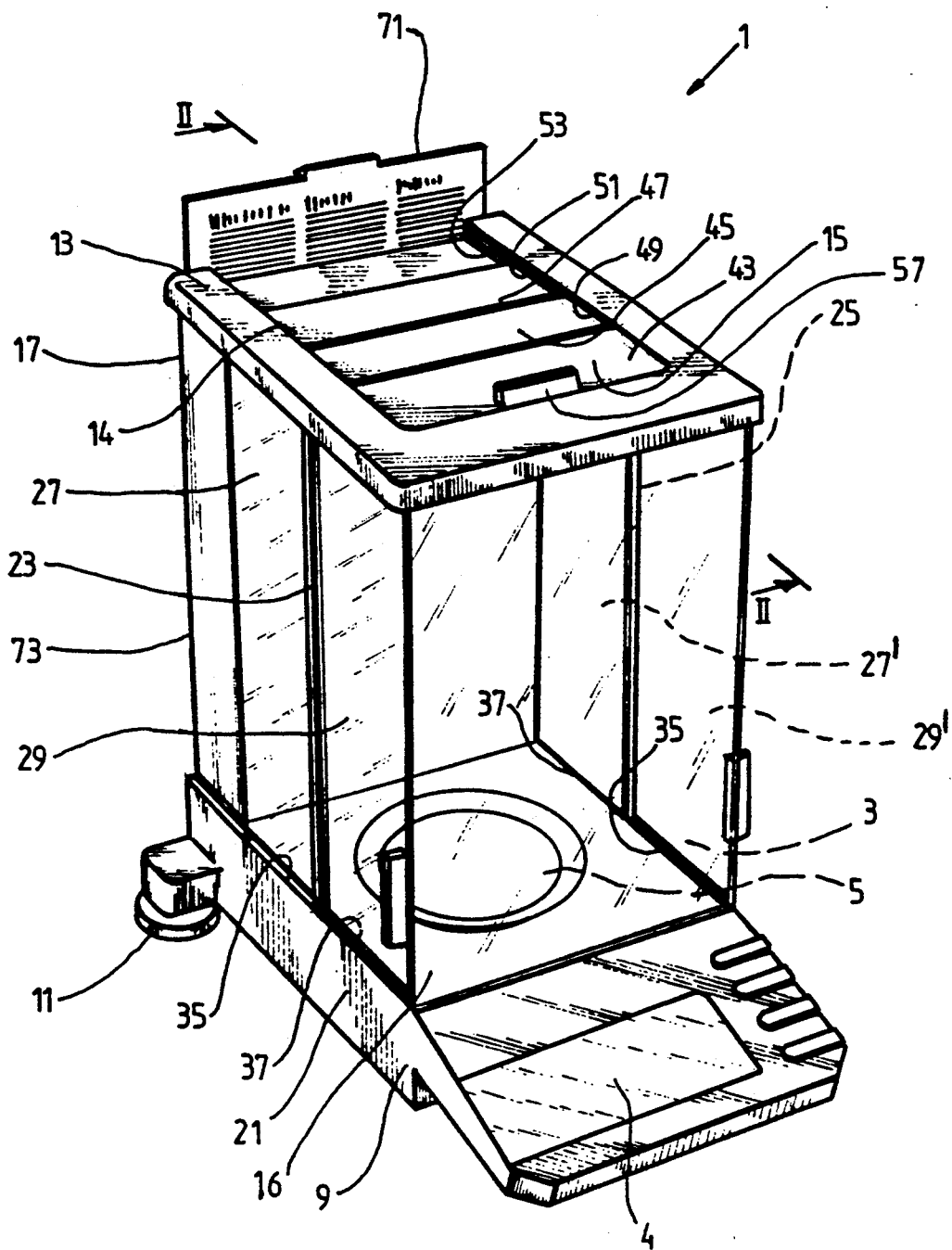
FIG. 1 is a perspective view of the weighing apparatus of the present invention.

Referring first more particularly to FIG. 1, the weighing scale housing 1 contains a weighing chamber 3 in which is movably mounted a weighing pan 5 which receives the material to be weighed. On the front of the base portion of the housing, a conventional keyboard and display means 4 is provided for operating electrical and mechanical components contained within the base portion 9 of the housing. The weighing scale housing includes three threadably connected leveling feet 11, of which only one is visible in FIG. 1. The housing includes a top wall 13 containing an upper access opening 14, which opening is normally closed by window means 15 including a plurality of slidably displacable window segments 43, 45, and 47 the longitudinal edges of which overlap, thereby to close the upper portion of the weighing chamber 3. A housing rear wall 17 supports the top wall 13. Front wall 16 comprises a transparent window panel that is supported between the base and the top wall 13. The sides of the weighing chamber 3 are closed by opposed side walls 23 and 25 that are connected between the top wall 13 and the housing base portion 21. In accordance with a characterizing feature of the invention, the side windows 23 and 25 each consist of a plurality of window segments 27, 29 and 27', 29', respectively. The adjacent vertical longitudinal edges of the window segments 27 and 29, and 27', and 29', overlap, respectively, by several millimeters, even when in the illustrated closed positions.

Figure 2:
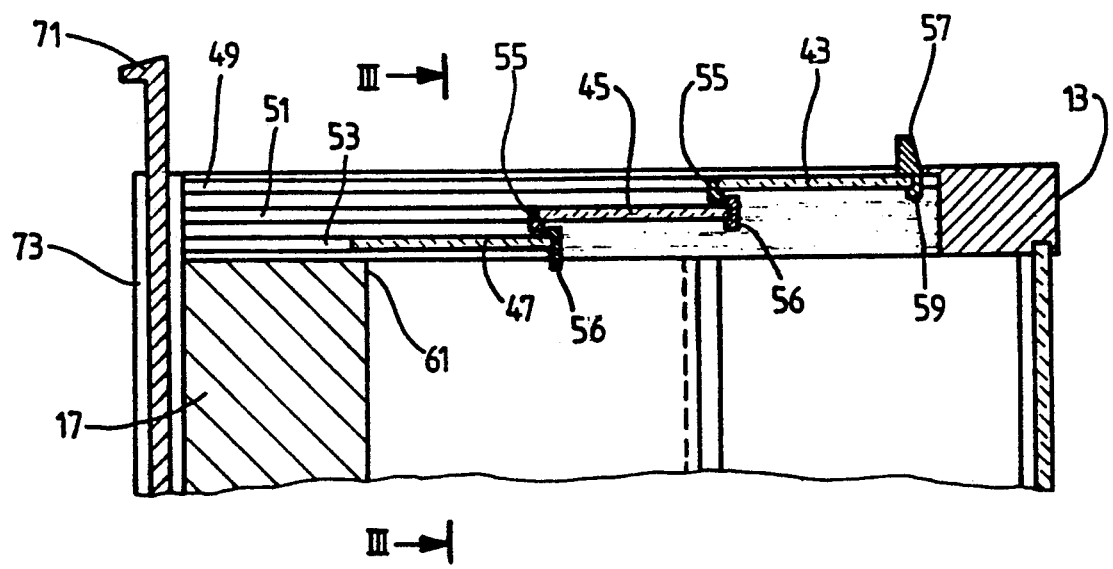
FIG. 2 is a detailed sectional view of the top portion of the housing taken along line II—II of FIG. 1.
Figure 3:
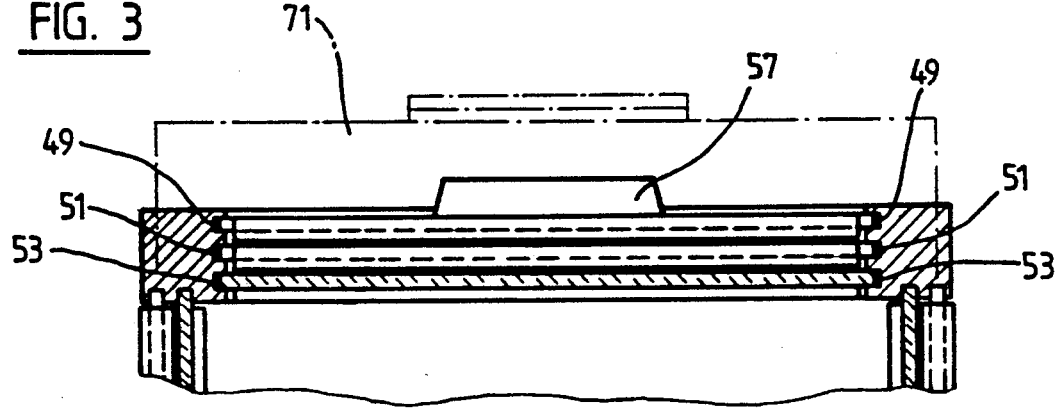
FIG. 3 is a sectional view taken along line III—III of FIG. 2.
Figure 4:
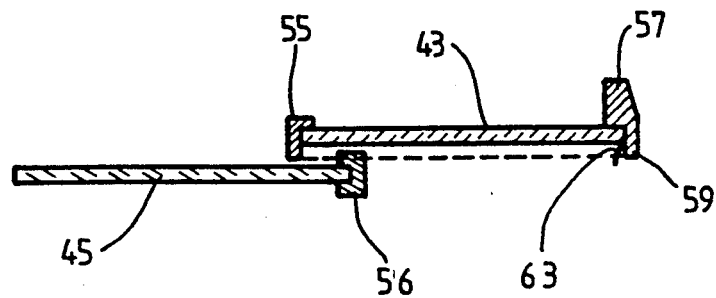
FIG. 4 is a detailed sectional view of a pair of the window segments of FIG. 2.

Similarly, the top window 15 includes a plurality of window segments 43, 45, 47 that overlap at their adjacent longitudinal edges. As shown in FIGS. 2 and 3, the lateral end portions of the horizontal top window segments 43, 45 and 47 are slidably mounted within corresponding guide grooves 49, 51, and 53, respectively, contained in the sidewalls of the opening 14. The lengths of the guide grooves 49, 51 and 53 are such relative to the width of the window segments 43, 45 and 47, respectively that when the segments are displaced rearwardly toward their open positions, the access opening 14 in the top frame 13 is completely unobstructed, thereby giving full access to the weighing chamber 3 and the weighing pan 5 contained therein. According to an important feature of the invention, the adjacent longitudinal edge portions of the segments are provided with cooperating catch segments 55 and 56, respectively. The segments are such that when the uppermost window segment 43 is displaced toward the closed position illustrated in FIG. 2, the catch 55 thereon will engage the corresponding catch 56 at the forward end of the next lower window segment 45, and thereby pull the same toward the closed position. Furthermore, a catch 55 at the rear longitudinal edge of segment 45 engages a corresponding catch 56 on the forward edge of the next lower segment 47, thereby displacing the same also toward the closed position. When the uppermost segment 43 is displaced rearwardly by the handle means 57, a projection 59 thereon will engage the catch 56 at the forward longitudinal edge of the next segment 45, thereby displacing the same rearwardly toward the open position. The vertical dimensions of the protruding portions of the handle and the catches is about 1 millimeter, and thus very small.

According to another feature of the invention the cooperating catch members 55 and 56 extend longitudinally the length of the associated window segment, whereby a sealing effect is produced when the catch elements are in cooperating engagement. When the handle 57 is displaced forwardly all of the segments 43, 45 and 47 are displaced forwardly toward their closed position illustrated in FIG. 2. To open the access opening 14, the operator displaces window segment 43 to the rear by means of the operating handle 57. Projection 59 on the handle thus engages the catch 56 on the window segment 45, thereby to also displace this window segment rearwardly toward the open position. Furthermore, the lower edge of the catch 56 on window segment 45 engages the upper portion of the catch 56 on window segment 47, thereby to also displace it rearwardly toward the open position. Thus, when all of the window segments are displaced rearwardly to the fully open position, the segments are in superimposed relation above the rear wall 17. Preferably, the catch 56 of the lowermost window segment 47 is arranged to engage the forward edge 61 of the rear wall 17 when the segment 47 is displaced to the fully open position, thereby preventing the wall segments from inadvertently being displaced rearwardly beyond the housing rear wall 17. In this case, the rear ends of the guide slots 49, 41 and 53 need not be closed to prevent inadvertent removal of the window segments 43, 45 and 47.

As indicated above, when handle 57 is displaced forwardly, the window segments 43, 45 and 47 are simultaneously displaced forwardly to the closed positions by the cooperation between the catches 55 and 56 on the various segments, respectively. Thus, the window segments 43, 45 and 47 are protected against the formation of scrapes or scratches.

In like manner, the vertically arranged sidewall segments 27, 29 and 27' 29' may be displaced rearwardly in an overlapping manner along corresponding guide means 35 and 37, thereby to afford lateral access to the weighing chamber 3. Corresponding overlapping mutual catches may be provided on the sidewall segments, as described above with regard to the top wall segments. In order to clean the top wall window segments 43, 45 and 47, one needs merely to displace them out rearwardly of the guide grooves 49, 51 and 53, respectively, without the use of any tools. In order to achieve this, the uppermost window segment may be lifted somewhat so that the catch 55 and the projection 59 thereon are lifted above the corresponding engaging portions of the next segment 45. Furthermore, to make certain that the lowest catch 56 associated with the lowermost window segment 47 is not stopped by the edge of rear wall 17, it is lifted somewhat above said edge 61. In order to permit this, the widths of the guide grooves 49, 51 and 53 are somewhat greater than the corresponding thickness of the window segments 43, 45 and 47.

Furthermore, a vertically displaceable instruction panel 71 may be provided parallel and adjacent the rear wall 17. Thus, as shown in FIG. 2, the instruction panel 71 serves to close the rear ends of the guide grooves 49, 51 and 53, and thereby prevent inadvertent removal of the window segments 43, 45 and 47. When the construction panel 71 is slid completely upwardly from its guide groove 73, the top window segments 43, 45 and 47 are then unobstructed and free for removal from the housing. Thus, the panel 71 may also serve as locking means for maintaining the window segments 43, 45, and 47 within their corresponding guide grooves 47, 51 and 53, respectively, during transportation of the scale.

Figure 5:
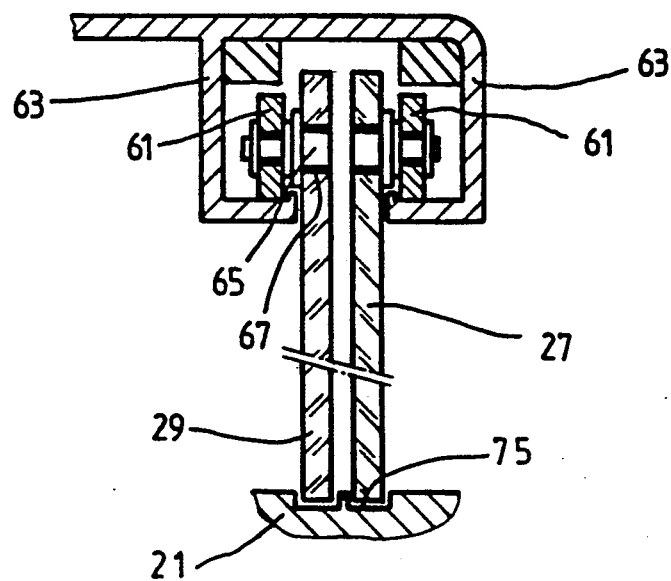
FIGS. 5 and 6 are detailed sectional views of two embodiments of the invention having roller guide means for guiding displaceable side wall segments.

Referring to FIG. 5, in order to prevent tilting of the relatively tall sidewall segments 27 and 29 and 27' and 29', respectively, guide rollers 61 may be provided at the upper edge portions of the sidewall segments 27 and 29, thereby also to reduce friction during sliding movement of the sidewall segments. In the embodiment of FIG. 5, the rollers 61 engage sidewall surfaces of corresponding guide grooves formed in the wall portion 63, the rollers being rotatably supported for movement about shafts 65 mounted in corresponding openings 67 contained in the upper edge portions to the sidewall panels 27 and 29, respectively.

Figure 6:
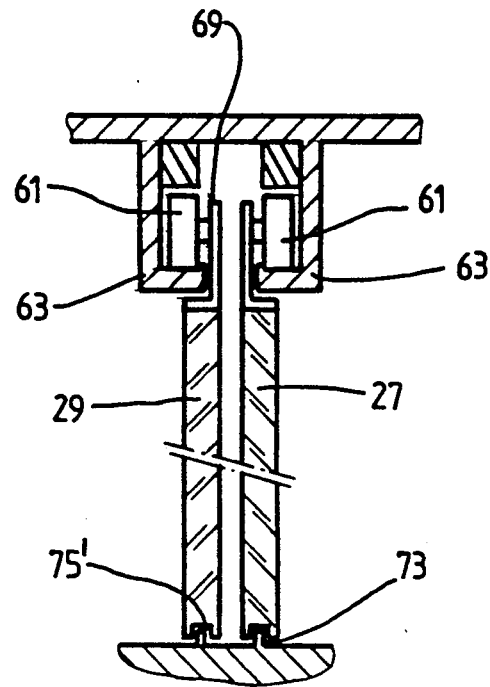

Alternatively, as shown in the modification of FIG. 6, the rollers may be connected with the upper edges of the sidewall segments 27 and 29 by means of L-shaped bracket means 69 that are adhesively secured to the ends of the upper edge portions of the sidewall segments 27 and 29. At their lower edges, the sidewall segments may be guided within grooves 75 contained in the bottom wall 21 as shown in FIG. 5, or the panels may be provided at their lower edges with grooves 75' that receive corresponding stationary ribs or pins 73 provided on the housing bottom wall.

While in accordance with the provisions of the Patent Statutes, the preferred forms and embodiments of the invention have been illustrated and described, it will be apparent to those skilled in the art that various changes may be made without deviating from the inventive concepts set forth above.

What is claimed is:

1. In a weighing scale housing having front (16), rear (17), side (23, 25), and top (15) walls cooperating with a base (9) to define a weighing chamber (3) in which is movably mounted a weighing pan (5); the improvement wherein at least one of said top and side walls contains an access opening, and a plurality of parallel window segments (43, 45, 47; 27, 29) connected with said one wall for sliding movement relative to each other between open and closed positions relative to said access opening, at least the longitudinal edge portions of said window segments being in continuous overlapping relation.

2. Apparatus as defined in claim 1, wherein said one wall includes a frame having a pair of parallel opposed guide means (49, 51, 53; 35, 37) adjacent opposite sides of said access opening, opposed end portions of said window segments being guided by said guide means for sliding movement relative to said one wall frame.

3. Apparatus as defined in claim 2, wherein said guide means contain opposed grooves having a width dimension that is greater than the thickness of said segments.

4. Apparatus as defined in claim 3, wherein said guide means include a plurality of guide rollers (61), and means connecting said guide rollers with edge portions of said segments, said rollers being rotatable about axes normal to said segments and being in rolling engagement with side walls of said grooves.

5. Apparatus as defined in claim 4, wherein said guide roller connecting means include roller shafts (65) upon which said rollers are rotatably mounted, said roller shafts being mounted in openings (67) contained in said segments.

6. Apparatus as defined in claim 4, wherein said guide roller connecting means include roller shafts (65) upon which said rollers are rotatably mounted, and L-shaped brackets (69) connecting said roller shafts with the end surfaces of said segments.

7. Apparatus as defined in claim 4, wherein said segments are vertical sidewall segments the upper edge portions of which are guided by said guide roller means, and further including lower guide means guiding the lower edge portions of said segments for displacement relative to said housing.

8. Apparatus as defined in claim 7, wherein said lower guide means comprise a plurality of parallel guide grooves (75) formed in said base for guiding the lower edges portions of said segments, respectively.

9. Apparatus as defined in claim 7, wherein said lower guide means include a plurality of upwardly extending projections (73) on said base that extend into corresponding grooves (75) contained in the lower edge portions of said segments.

10. Apparatus as defined in claim 1, and further including a pair of catch means (55, 56) connected with the overlapping longitudinal edge portions of first and second superposed window segments, said catch means being arranged for engagement during displacement of said first window segment in a given direction relative to said one wall to effect displacement of said second window segment in the same direction relative to said one wall.

11. Apparatus as defined in claim 10, wherein said catch means extend generally the length of said segments, said catch means being in sealing engagement when said segments are in the closed position.

12. Apparatus as defined in claim 1, and further including a vertical instruction panel adjacent and parallel with said rear wall, said instruction panel being connected with said housing for vertical sliding movement relative to said rear wall.

13. Apparatus as defined in claim 1 wherein said window segments are transparent, planar, and generally identical.

* * * * *